United States Patent
Armstrong et al.

(10) Patent No.: US 10,988,035 B2
(45) Date of Patent: Apr. 27, 2021

(54) VARYING QUANTITIES OF MOTOR POLES FOR NOISE REDUCTION

(71) Applicants: Rolls-Royce Corporation, Indianapolis, IN (US); Rolls-Royce North American Technologies, Inc., Indianapolis, IN (US); Rolls-Royce PLC, London (GB)

(72) Inventors: Michael James Armstrong, Avon, IN (US); Mark Jon Blackwelder, Plainfield, IN (US); David John Howard Eames, Zion Crossroad, VA (US); Ellis Fui Hen Chong, Derby (GB)

(73) Assignees: Rolls-Royce Corporation, Indianapolis, IN (US); Rolls-Royce North American Technologies, Inc., Indianapolis, IN (US); Rolls-Royce PLC, London (GB)

( * ) Notice: Subject to any disclaimer, the term of this patent is extended or adjusted under 35 U.S.C. 154(b) by 0 days.

(21) Appl. No.: 16/600,196

(22) Filed: Oct. 11, 2019

(65) Prior Publication Data
US 2020/0047897 A1 Feb. 13, 2020

Related U.S. Application Data

(63) Continuation of application No. 15/176,765, filed on Jun. 8, 2016, now Pat. No. 10,442,542.
(Continued)

(51) Int. Cl.
*B60L 50/10* (2019.01)
*B64D 31/06* (2006.01)
*H02P 5/74* (2006.01)

(52) U.S. Cl.
CPC .............. *B60L 50/10* (2019.02); *B64D 31/06* (2013.01); *H02P 5/74* (2013.01); *B60L 2200/10* (2013.01);
(Continued)

(58) Field of Classification Search
CPC ............ B60L 50/10; B64D 31/06; H02P 5/74
See application file for complete search history.

(56) References Cited

U.S. PATENT DOCUMENTS 5,645,250 A * 7/1997 Gevers ...................... B64C 3/38
244/101
5,903,115 A * 5/1999 Taylor ....................... H02P 5/74
318/34
(Continued)

FOREIGN PATENT DOCUMENTS

CN 101932469 A 12/2010
CN 102046408 A 5/2011
(Continued)

OTHER PUBLICATIONS

Berg et al., "HTS Electrical System for a Distributed Propulsion Aircraft," IEEE Transactions on Applied Superconductivity, vol. 25, No. 3, Jun. 2015, 5 pp.
Communication Pursuant to Article 94(3) EPC from counterpart European Application 16173194.8, dated Aug. 1, 2019, 4 pgs.
Examination Report from counterpart European Application No. 16173194.8, dated Nov. 28, 2018, 5 pp.
(Continued)

*Primary Examiner* — Woody A Lee, Jr.
(74) *Attorney, Agent, or Firm* — Shumaker & Sieffert, P.A.

(57) ABSTRACT

An alternating current type electric propulsion system is described that includes an AC generator and a plurality of propulsors electrically coupled to the AC generator. A first propulsor from the plurality of propulsors includes a first motor that drives a first fan of the first propulsor at a first speed. A second propulsor from the plurality of propulsors comprises a second motor that drives a second fan of the second propulsor at a second speed that is different than the first speed.

18 Claims, 5 Drawing Sheets

Related U.S. Application Data

(60) Provisional application No. 62/174,065, filed on Jun. 11, 2015.

(52) U.S. Cl.
CPC ..... *B60L 2270/142* (2013.01); *B64D 2221/00* (2013.01); *Y02T 10/64* (2013.01)

(56) References Cited

U.S. PATENT DOCUMENTS

| | | | |
|---|---|---|---|
| 7,468,587 B2 | 12/2008 | Shkondin | |
| 7,555,893 B2 | 7/2009 | Okai et al. | |
| 8,074,755 B2 | 12/2011 | Abe et al. | |
| 8,469,306 B2 | 6/2013 | Kuhn, Jr. | |
| 8,727,271 B2 | 5/2014 | Salyer | |
| 10,442,542 B2 | 10/2019 | Armstrong et al. | |
| 2009/0156068 A1* | 6/2009 | Barrett | B60W 10/08 440/3 |
| 2012/0091832 A1* | 4/2012 | Soderberg | H01F 1/08 310/44 |
| 2012/0286516 A1 | 11/2012 | Chong et al. | |
| 2013/0126669 A1 | 5/2013 | Hamann et al. | |
| 2014/0183996 A1 | 7/2014 | He et al. | |
| 2014/0203739 A1 | 7/2014 | Chantriaux et al. | |
| 2014/0265994 A1* | 9/2014 | Mao | H02P 25/18 318/773 |
| 2015/0367950 A1* | 12/2015 | Rajashekara | B64C 11/305 701/3 |

FOREIGN PATENT DOCUMENTS

| | | |
|---|---|---|
| CN | 103475160 A | 12/2013 |
| JP | 05284778 A | 10/1993 |
| WO | 2014158240 A2 | 10/2014 |

OTHER PUBLICATIONS

Extended Search Report from counterpart European Application No. 16173194.8, dated Dec. 15, 2016, 6 pp.

Palumbo et al., "Aural Effects of Distributed Propulsion," 14th AIAA Aviation Technology, Integration, and Operations COnference, Jun. 16-20, 2014, 25 pp.

Response to Examination Report dated Nov. 28, 2018, from counterpart European Application No. 16173194.8, filed Mar. 22, 2019, 21 pp.

Response to Extended European Search Report dated Dec. 15, 2016, from counterpart European Application No. 16173194.8, filed Jul. 14, 2017, 7 pp.

Prosecution History from U.S. Appl. No. 15/176,765, dated Dec. 14, 2018 through Sep. 20, 2019, 28 pp.

The Notification of Reasons for Rejection, and translation thereof, from counterpart Japanese Application No. 2016-115891, dated Dec. 3, 2019, 3 pp.

Response to Communication from the Examining Division dated Aug. 1, 2019, from counterpart European Application No. 16173194. 8, filed Nov. 22, 2019, 10 pp.

Communication pursuant to Article 94(3) EPC from counterpart EP Application No. 16173194.8 dated Apr. 7, 2020, 4 pgs.

Notice of the First Office Action, and translation thereof from counterpart CN Application No. 201610714862.X dated Jul. 10, 2020, 8 pgs.

Response to Communication pursuant to Article 94(3) EPC from counterpart EP Application No. 16173194.8 dated Apr. 7, 2020, filed Aug. 11, 2020, 13 pgs.

Notice of Intent to Grant and Text Intended to Grant from counterpart European Application No. 16173194.8, dated Jan. 15, 2021, 34 pages.

Second Office Action and translation thereof from counterpart CN Application No. 201610714862.X dated Feb. 2, 2021, 7 pgs.

\* cited by examiner

VARYING QUANTITIES OF MOTOR POLES FOR NOISE REDUCTION

This application is a continuation of U.S. application Ser. No. 15/176,765 filed Jun. 8, 2016, which claims the benefit of U.S. Provisional Application No. 62/174,065 filed Jun. 11, 2015, the entire contents of which are hereby incorporated by reference.

BACKGROUND

Some aircraft rely on turboelectric distributed propulsion (TeDP) systems for powering propulsors that are placed around the airframe, for example, to provide thrust for controlling movement of the vehicle. Each propulsor may include a motor that drives a propeller fan and the electrical power used to drive each propulsor motor and fan may be generated by one or more on-board, turbo generators.

Slight variations in the speed of propulsor fans can have a dramatic impact on the amount of undesirable fan noise that is exerted from the aircraft. Some direct current (DC) type TeDP systems (through sacrificing size and weight) may reduce the perceptible peak sound pressure level by driving the propulsor fans at varying speeds using variable speed drives to spread the noise spectrum across more frequencies. Alternating current (AC) type TeDP systems require the speed of the propulsor motors to be synchronized with the speed of the other motors and the turbo generators. Accordingly, despite being smaller and lighter than DC-type TeDP systems, typical AC-type TeDP systems cannot vary the speed of the propulsor fans to spread the noise spectrum across multiple frequencies and therefore, may appear louder than some DC-type TeDP systems.

SUMMARY

In one example, the disclosure is directed to an alternating current (AC) type electric propulsion system, that includes an AC generator; and a plurality of propulsors electrically coupled to the AC generator, wherein: a first propulsor from the plurality of propulsors comprises a first motor that drives a first fan of the first propulsor at a first speed; and a second propulsor from the plurality of propulsors comprises a second motor that drives a second fan of the second propulsor at a second speed that is different than the first speed.

In another example, the disclosure is directed to a method that includes selecting, by at least one processor, a first rotational frequency for a first fan of a first propulsor that is being driven by an alternating current (AC) generator of an AC type electric distribution system; selecting a second rotational frequency for a second fan of a second propulsor that is also being driven by the AC generator, the second rotational frequency being different from the first rotational frequency by a frequency variation; selecting a minimum pole pair offset for differentiating a first quantity of pole pairs of a first motor of the first propulsor from a second quantity of pole pairs of a second motor of the second propulsor; determining, based on the first rotational frequency and the second rotational frequency and the minimum pole pair offset, a minimum quantity of pole pairs; and configuring the first motor to use the minimum quantity of pole pairs as the first quantity of pole pairs.

In yet another example, the disclosure is directed to alternating current (AC) type electric propulsion system that includes means for selecting a first rotational frequency for a first fan of a first propulsor that is being driven by an AC generator of the AC type electric distribution system; means for selecting a second rotational frequency for a second fan of a second propulsor that is also being driven by the AC generator, the second rotational frequency being different from the first rotational frequency by a frequency variation; means for selecting a minimum pole pair offset for differentiating a first quantity of pole pairs of a first motor of the first propulsor from a second quantity of pole pairs of a second motor of the second propulsor; means for determining, based on the first rotational frequency and the second rotational frequency and the minimum pole pair offset, a minimum quantity of pole pairs; and means for configuring the first motor to use the minimum quantity of pole pairs as the first quantity of pole pairs.

The details of one or more examples are set forth in the accompanying drawings and the description below. Other features, objects, and advantages of the disclosure will be apparent from the description and drawings, and from the claims.

DETAILED DESCRIPTION

Figure 1:
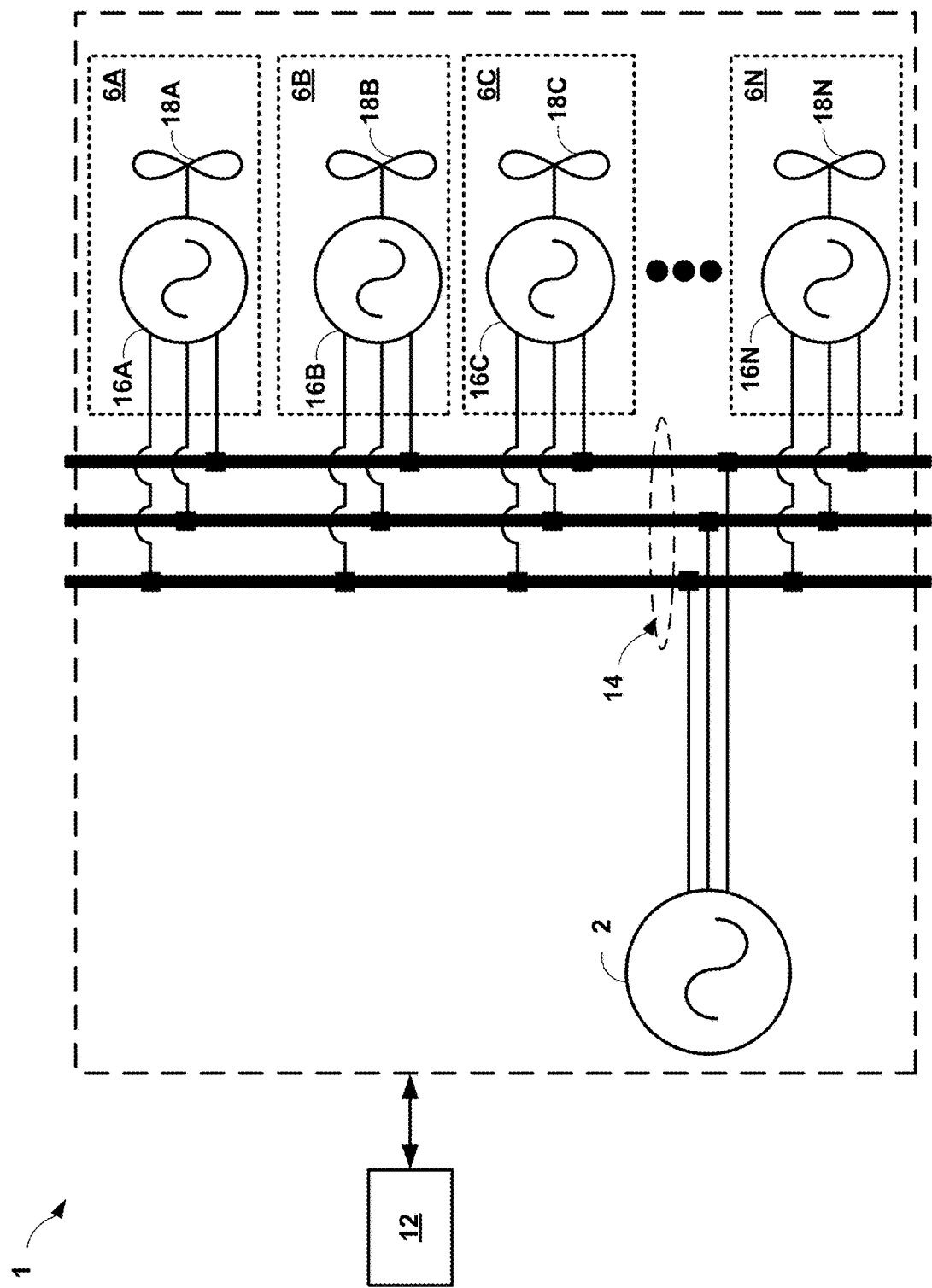
FIG. 1 is a conceptual diagram illustrating an example alternating current type turbo electric distribution propulsion system for providing electrical power from an alternating current generator to one or more propulsors, in accordance with one or more aspects of the present disclosure.

So-called distributed propulsion air vehicles that rely on turboelectric distributed propulsion (TeDP) systems for powering propulsors may decrease mass and increase efficiency by closely coupling the aerodynamic features (e.g., wings, tail sections, etc.) of the air vehicle with the propulsive functions (e.g., propulsor fans, etc.) of the air vehicle while also decoupling the propulsive functions of the air vehicle from the power generation functions (e.g., gas turbines, etc.) of the air vehicle. For example, in some blended-wing-body aircraft, the aerodynamic features and propulsive functions are coupled via boundary layer ingestion or deflected slipstream design (e.g., by placing propulsor fans along the trailing edge of the center wing body). Some traditional, cylindrical fuselage aircraft couple the aerodynamic functions with the propulsive functions by placing propulsor fans on the leading edge of sweptback wings and/or near the tail (e.g., to perform wing blowing for deflected slipstreams for fuselage boundary layer ingestion at the tail). In either case, by decoupling the propulsive functions (e.g., the propulsor fans) from the power generation functions (e.g., the low pressure [LP] shaft of a turbo generator), a distributed propulsion aircraft can include propulsor fans positioned around the outside of the vehicle, in an aerodynamic fashion, and operate at large effective bypass ratios.

Either alternating current (AC) or direct current (DC) type TeDP systems may be used to drive propulsor motors that spin propulsor fans. Regardless of the type of TeDP system being used, slight variations in the speed of propulsor fans can have a dramatic impact on the amount of undesirable fan noise that is exerted by the aircraft.

DC-type TeDP systems typically require heavy and large inversion and conversion equipment to distribute DC power. Despite being heavy and large, aircraft that rely on DC-type TeDP systems may operate propulsor fans at an improved pressure ratio by varying the speed of each propulsor motor independent from the other motors, and also, independent of the turbogenerator. As a result, DC-type TeDP systems may be able to reduce the observable, peak sound pressure level by driving the propulsor fans at varying speeds, using variable speed drives, to spread the noise spectrum across more frequencies.

DC-type TeDP systems may drive propulsors at particular speeds using variable speed drives that come with an additional size and weight penalty associated with power electronics. The additional variable speed drives may increase cost and complexity of a system. In addition, this solution may not by suitable for many applications, such as in aircraft, where decreasing size and weight to improve efficiency is an important requirement.

AC-type TeDP systems are typically smaller and lighter than DC-type TeDP systems since AC-type TeDP systems can forego the use of heavy and large inversion and conversion equipment required for distributing DC power. Even though aircraft that rely on AC-type TeDP systems may eliminate, much of the heavy and large inversion and conversion equipment needed by DC-type TeDP systems, AC-type TeDP systems require the speed of the propulsor motors to always be synchronized with the speed of the other propulsor motors and with the speed of the turbo generators. As a result, despite being smaller and lighter than DC-type TeDP systems, typical AC-type TeDP systems cannot vary the speed of the propulsor fans to spread the noise spectrum across multiple frequencies and therefore, may appear louder than some DC-type TeDP systems.

In general, techniques and circuits of this disclosure relate to an example AC-type TeDP system that enables an aircraft to operate propulsor motors, and propulsor fans, at different speeds without requiring DC distribution or even individual variable speed drives for each fan. As a result, an aircraft that uses the example AC-type TeDP system may realize the size and weight savings that AC-type TeDP systems typically have over DC-type TeDP systems, while also being able to reduce fan noise.

The example AC-type TeDP system may vary the pole count of the propulsor motors to configure the fans to operate at different speeds. By operating the fans at different speeds, the example AC-type TeDP system may broaden the noise spectrum associated with the fans and achieve a desired reduction in sound pressure, and perceptible noise level, as compared to other AC-type TeDP systems that may be forced to operate the fans at the same speed. The example AC-type TeDP system may even eliminate, or at least reduce, the additive noise from each propeller, without large variable speed drives.

FIG. 1 is a conceptual diagram illustrating system 1 as an example AC-type TeDP system for providing electrical power from AC generator 2 to one or more AC propulsors 6A-6N (collectively "propulsors 6"), in accordance with one or more aspects of the present disclosure. In one example, system 1 comprises part or all of a turbo electric propulsion system onboard an aircraft. System 1 may be part of other types of vehicles, such as a marine craft, or some other system that relies on an AC-type TeDP system to achieve its operating requirements for distributing power from an AC generator to one or more AC propulsors.

System 1 includes AC generator 2, propulsors 6, control unit 12, and electrical bus 14. AC generator 2 provides AC electrical power that system 1 distributes via bus 14, for driving propulsors 6. System 1 may include additional converters, breakers, inverters, and any other electrical components or circuitry that system 1 needs for distributing power from AC generator 2 to each of propulsors 6.

AC generator 2 represents any AC generator for use in an AC-type TeDP system such as system 1. AC generator 2 is configured to output variable frequency, three-phase AC power to each of propulsors 6. In some examples, AC generator 2 may be a turbogenerator. And in some examples, AC generator 2 may be driven by one or more diesel-powered turbines, gas-powered turbines, nuclear-powered turbines, or various other types of turbines.

System 1 includes control unit 12 which, for the sake of brevity and clarity, is shown as, generally, being operatively coupled to all of the components of system 1. In other words, control unit 12 is configured to provide signals and information to each of the different components of system 1, including AC generator 2 and propulsors 6. For example, control unit 12 may send information to AC generator 2 and one or more of propulsors 6 for configuring system 1 to distribute, and refrain from distributing, AC power from AC generator 2 to propulsors 6. In some examples, control unit 12 may be only operatively coupled to some of the components of system 1.

Control unit 12 may comprise any suitable arrangement of hardware, software, firmware, or any combination thereof, to perform the techniques attributed to control unit 12 that are described herein. Examples of control unit 12 include any one or more microprocessors, digital signal processors (DSPs), application specific integrated circuits (ASICs), field programmable gate arrays (FPGAs), or any other equivalent integrated or discrete logic circuitry, as well as any combinations of such components. When control unit 12 includes software or firmware, control unit 12 further includes any necessary hardware, such as one or more processors or processing units, for storing and executing the software or firmware.

In general, a processing unit may include one or more microprocessors, DSPs, ASICs, FPGAs, or any other equivalent integrated or discrete logic circuitry, as well as any combinations of such components. Although not shown in FIG. 1, control unit 12 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to control unit 12 (e.g., may be external to a package in which control unit 12 is housed).

Propulsors 6 are example propulsor devices that are driven by the variable frequency, three-phase AC power provided to system 1 by AC generator 2. In some examples, the primary role of propulsors 6 is to provide thrust for controlling movement of a host aircraft or marine craft.

Each of propulsors 6 is coupled to AC generator 2 via three-phase power bus 14. Each of propulsors 6 is driven by the variable frequency, three-phase AC power provided to power bus 14 from AC generator 2. In some examples, power bus 14 may include additional breakers, converters, inverters, and other equipment necessary for electrically coupling AC generator 2 to each of propulsors 6.

Each of propulsors 6 includes at least one respective three-phase AC electrical motor 16A-16N (collectively "motors 16") and at least one respective propulsor fan 18A-18N (collectively "fans 18"). In some examples, one or more of propulsors 6 may include multiple AC electrical motors 16 and/or more than one propulsor fan 18. In addition, each of propulsors 6 may include additional components for communicating with and/or being controlled by AC generator 2 and/or control unit 12. For instance, propulsor 6A may include one or more switches other circuitry that enable control unit 12 and/or AC generator 2 to vary the group of windings with which motor 16A of propulsor 6A uses to spin fan 18A.

In order to reduce audible noise that may be attributed to the spinning of fans 18, system 1 requires that each of motors 16 has a different quantity of pole pairs (also referred to herein as a "pole count") so that each of fans 18 runs at different speeds. By having different pole counts across each of motors 16, and as a result of fans 18 operating at slightly different speeds, system 1 may limit or otherwise prevent at least some of the audible noise frequencies attributed to fans 18 from being additive. And in some examples, the varying pole counts of motors 16 may even enable system 1 to cancel some of the audible noise frequencies altogether. In this way, system 1 may eliminate or at least reduce the amount of audible noise that can be observed coming from fans 18 when fans 18 are being driven by an AC-type TeDP system, such as system 1, without relying on any additional, individual, oftentimes large and heavy, variable speed drives for each of propulsors 6.

It should be understood that in some examples, to reduce audible noise that may be attributed to the spinning of fans 18, system 1 may also vary the quantity of fan blades associated with adjacent fans 18 when used as propellers. And in some examples, to reduce audible noise that may be attributed to the spinning of fans 18, system 1 may also vary the quantity of blades and/or stators on adjacent fans 18 when used as propulsors. In other words, system 1 may further reduce fan noise by varying the quantity of blades associated with each of fans 18 as compared to adjacent fans 18.

Given that system 1 is an AC-type TeDP system, AC generator 2 and each of propulsors 6 is driven by the same electrical frequency ($f_e$). The respective speed ($\omega_F$) of each of fans 18 depends on the speed ($\omega_G$) of AC generator 2, the quantity of pole pairs ($p_G$) of AC generator 2, and a respective quantity of pole pairs ($p_M$) of the corresponding one of propulsor motors 16 that drives that particular fan. Said differently, the speed of any one of propulsor fans 18 is based on a ratio of the pole count of AC generator 2 and the respective pole count of the corresponding propulsor motor 16 that drives that propulsor fan. As such, the relationship between pole counts of AC generator 2 and each of motors 16, as the relationship pertains to the speed of fans 18, results in a seemingly "fixed" gear ratio between AC generator 2 and each of motors 16.

For example, the derivation below uses propulsor 6A as just one example to demonstrate the relationship between the speed of fan 18A and the speed of AC generator 2. It should be understood that the speed of each of fans 18 and propulsors 6 may share a similar relationship with the speed of AC generator 2 as the relationship described below with respect to propulsor 6A and AC generator 2.

Consider EQ. 1, which provides the relationship between the number of pole pares ($p_G$) of AC generator 2, to the mechanical speed of AC generator 2 ($\omega_G$) in revolutions per minute, and electrical frequency of AC generator 2 in Hertz ($f_e$).

$$p_G \omega_G = 60 f_e \qquad \text{EQ. 1}$$

Since the fan speed ($\omega_f$) of fan 18A, and fan rotational frequency ($f_f$) of fan 18A is a function of the electrical frequency and the number of pole pares ($p_M$) for motor 16A, the speed ($\omega_F$) of fan 18A and the fan rotational frequency ($f_f$) of fan 18A can be determined as a function of the pole pair ratio between the quantity of pole pairs ($p_M$) of motor 16A and the quantity of pole pairs ($p_G$) of AC generator 2. As shown in EQ. 2, the speed ($\omega_F$) of fan 18A is based on the speed ($\omega_G$) of AC generator 2, the quantity of pole pairs ($p_M$) for motors 16A and the quantity of pole pairs ($p_G$) for AC generator 2.

$$\omega_F = \omega_G(p_G/p_M) \qquad \text{EQ. 2}$$

Accordingly, and because slight variations in the speeds ($\omega_F$) of propulsor fans 18 can have a dramatic impact on the amount of undesirable fan noise that is exerted from system 1, and in order to broaden the noise spectrum of fans 18, system 1 can vary the pole counts ($p_M$) for each of motors 16 to better spread the noise spectrum associated with fans 18 and obtain one or more preferred combinations of fan speeds ($\omega_F$) amongst fans 18 by using individual propulsors 6, or groups of propulsors 6, that have different quantities of pole pairs ($p_M$) for each propulsor motor 16 or group of motors 16.

An example fine-tuning ratio between fan speeds ($\omega_F$) and rotational frequencies ($f_F$) of fans 18A and 18B, so as to broaden the noise spectrum of system 1, is provided in EQ. 3. EQ. 3 assumes that in some examples, the quantity of pole pairs ($p_M$) for each of motors 16 may be of a sufficiently high quantity so that the difference in pole counts ($p_M$) between any two motors 16 is at least an integer quantity (n) of pole pairs (e.g., one, two, four, six, or some other integer value) so as to provide small frequency changes between fans.

$$\frac{f_{F18A}}{f_{F18B}} = \frac{p_{M16A}}{p_{M16B} \pm n} \qquad \text{EQ. 3}$$

For example, by offsetting the number of pole pairs by plus or minus two pole pairs, and assuming fan 18A has a one hundred hertz rotational frequency $f_{F18A}$, system 1 will be able to achieve approximately ten hertz frequency variation (also referred to herein as "frequency offset") in rotational frequency $f_F$ between fans 18A and 18B by selecting motor 16A to have at least twenty or more pole pairs ($p_M$).

In some examples, no two motors 16 have a same quantity of pole pairs ($p_M$). In other examples, no two groups of motors 16 has a same quantity of pole pairs ($p_M$) but individual motors 16 within each group may have similar or the same quantity of pole pairs ($p_M$). System 1 may include any sufficiently varied quantity of pole pairs ($p_M$) distributed amongst motors 16 that results in the desired reduction in sound or noise pressure level.

Accordingly, the described circuits and techniques of this disclosure may enable an example AC-type TeDP system, such as system 1, to spread noise being generated by propulsor fans across the noise spectrum by selecting motors with different pole pairs for each propulsor motor or group of propulsor motor so as to cause the corresponding propulsor fans (e.g., propellers) to operate, according to the derived pole pair ratio of EQS. 1-3, at slightly different speeds. As a result, the example AC-type TeDP system need not utilize heavy and expensive individual variable speed drives for each propulsor. In addition, an aircraft (or other marine craft, etc.) that uses the example AC-type TeDP system may realize the size and weight savings that AC-type TeDP systems typically have over DC-type TeDP systems, while also being able to reduce fan noise. The example AC-type TeDP system may even eliminate, or at least reduce, the additive noise from each propeller, without large variable speed drives.

Note, even though FIG. 1 is shown as having a single AC generator 2 that drives each of fans 18, in some examples, some aircraft include multiple engines and multiple generators. In some multi-engine aircraft, different propulsors may be driven independently by different generators and different engines. In these multi-engine examples, the spreading of the noise frequency spectrum may be achieved not only by varying quantities of pole pairs, but also, by operating each engine at a slightly different speed so as to cause each corresponding propulsor fan to spin at a slightly different speed.

The techniques and circuits described herein assume that the example AC-type TeDP system is a variable speed electrical distribution system driving the propulsor motors. However, in other examples, some of the techniques and circuits described herein may be applicable to different types of propulsion system (e.g., mechanical distribution concepts) in which the gear ratios between generator and motor are fixed.

In some examples, the pole count associated with propulsor motors and generators may be changed while in operation (e.g., by switching windings). Switching windings on the fly in this way may enable an aircraft to vary its audible sound signature on-the-fly, by changing the gear ratio and the ratio of pole pairs during operation.

Figure 2:
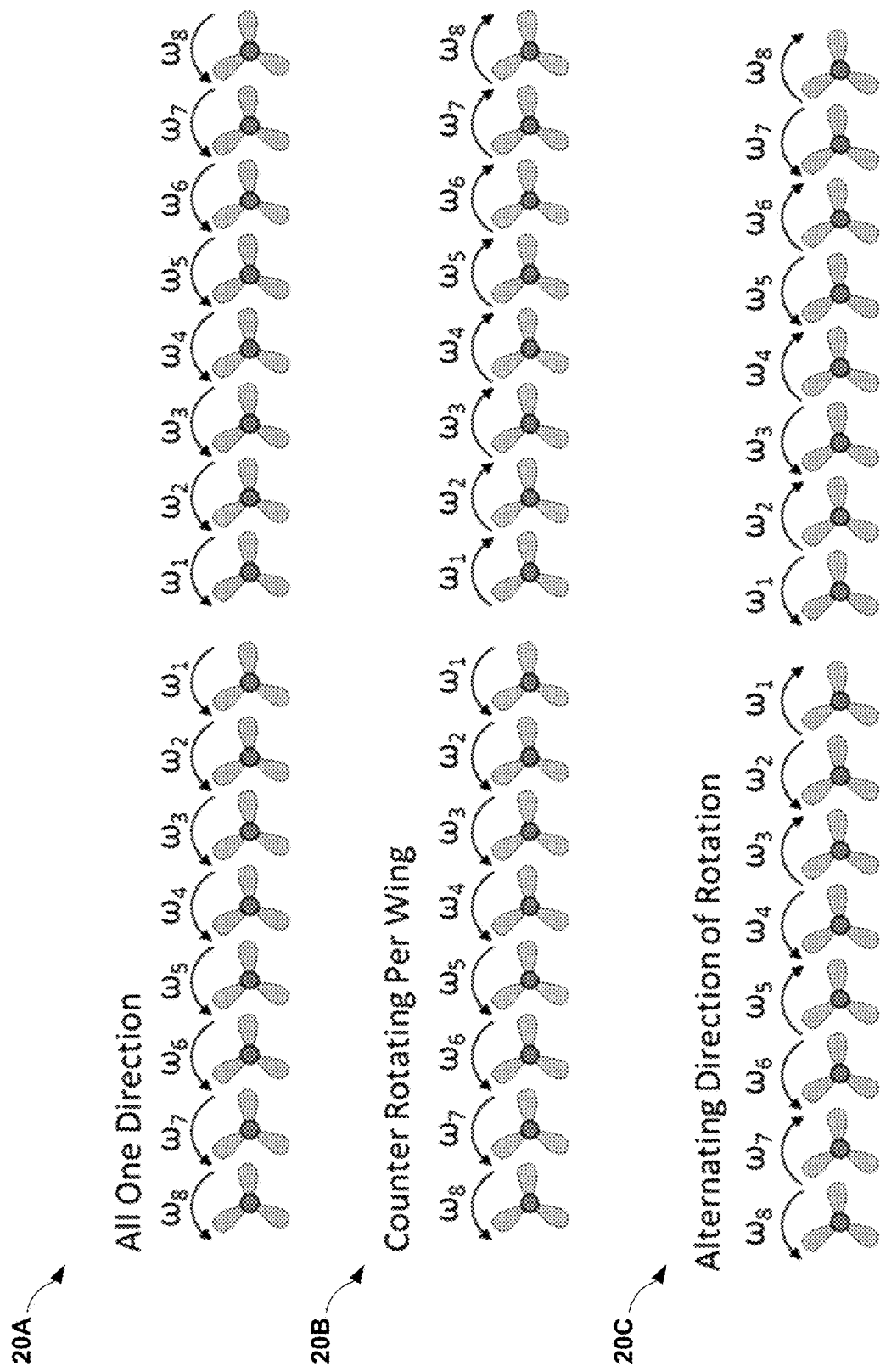
FIG. 2 is a conceptual diagram illustrating example propulsor fan rotational direction concepts that are compatible with the example alternating current type turbo electric distribution propulsion system of FIG. 1.

FIG. 2 is a conceptual diagram illustrating example propulsor fan rotational direction concepts 20A-20C that are compatible with AC-type TeDP system 1 from FIG. 1. FIG. 2 is described below in the context of system 1 of FIG. 1.

The purpose of FIG. 2 is to show that the idea of varying quantities of pole pairs amongst various propulsor motors to spread the noise frequency spectrum associated with the propulsor motors, is applicable to a variety of fan rotational concepts. For example, the described techniques are applicable to variable turbine speed concepts for propulsion control and variable pitch fan control.

With variable speed control in an AC-type TeDP system, such as system 1, the fan frequencies typically change proportional to throttle commands. And with variable fan pitch concepts in an AC-type TeDP system, such as system 1, the fan frequencies may be held constant through turbogenerator controls. Nevertheless, in both cases, the fan frequency ratios will stay the same depending on the fan.

Propulsor fan rotational direction concepts 20A-20C show that not all fans need to operate at different speeds and in fact, sets of fans may be grouped and operate at similar speeds. For example, concept 20A shows an "all one direction" rotational direction concept in which each of the fans is rotating in the same direction. In this example, there are sixteen fans or propellers and each is moving in the same direction. However, even though there are sixteen fans, the sixteen fans are moving at only eight different speeds. Each fan is paired with another fan and the eight fan pairs are all moving in the same direction, but at different speeds from the fans of other pairs.

Concept 20B shows a "counter rotating per wing" rotational direction concept in which each of the fans on the left wing are rotating in the same direction and each of the fans on the right wing are rotating in the opposite direction. However, again, even though there are sixteen fans, the sixteen fans are moving at only eight different speeds. Each fan on the right wing is paired with another fan on the left wing that moves in the opposite direction. The eight fan pairs are all moving at different speeds from the fans of other pairs.

Concept 20C shows an "alternating direction of rotation" rotational direction concept in which the fans alternates in sequence, from left to right, between rotating in one of two directions. However, again, even though there are sixteen fans, the sixteen fans are moving at only eight different speeds. Each fan pair includes two fans that move in the opposite direction but at the same speed. The eight fan pairs are all moving at different speeds from the fans of other pairs.

Figure 3A:
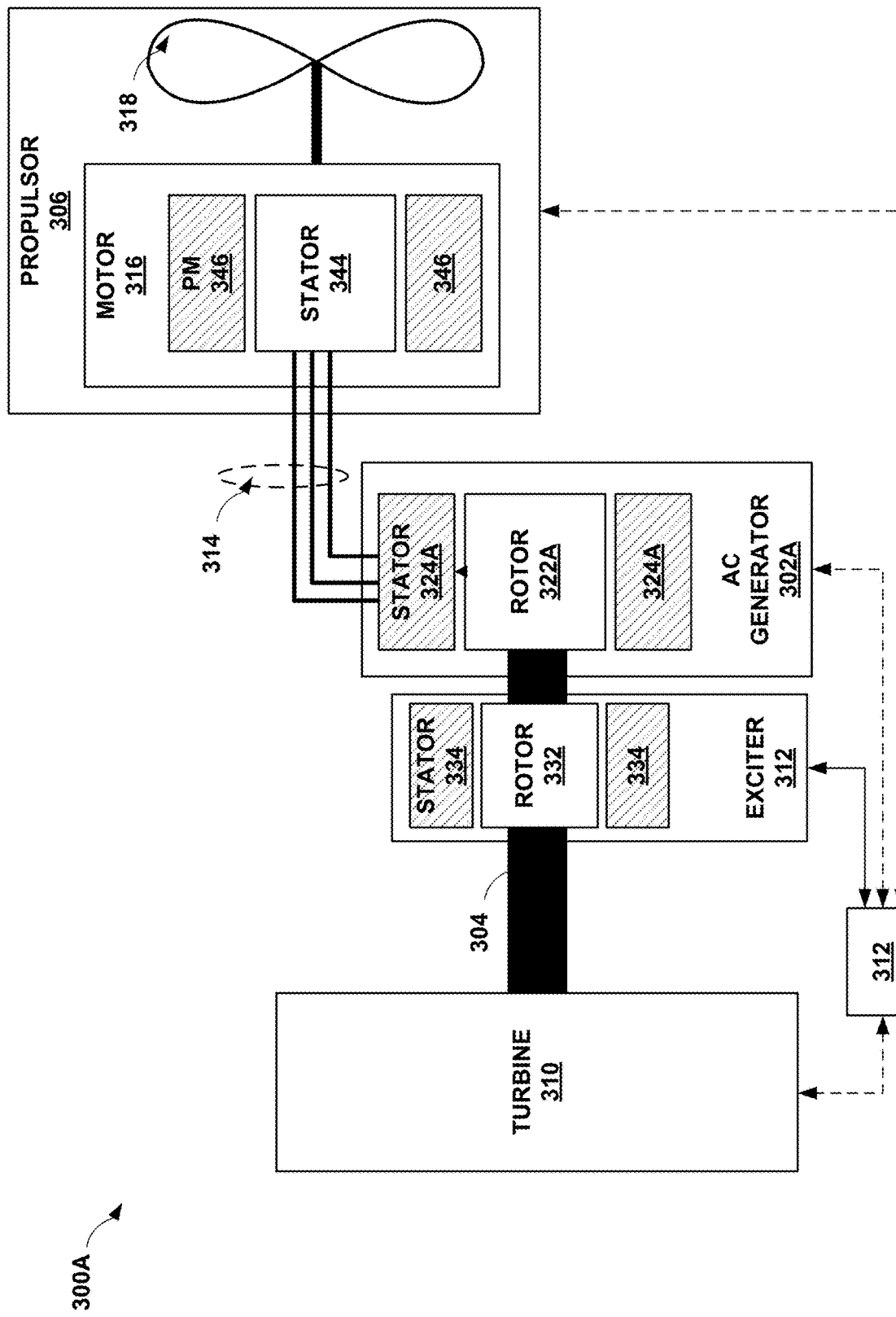
FIGS. 3A and 3B are conceptual diagrams illustrating detailed examples of a portion of the example alternating current type turbo electric distribution propulsion system of FIG. 1.
Figure 3B:
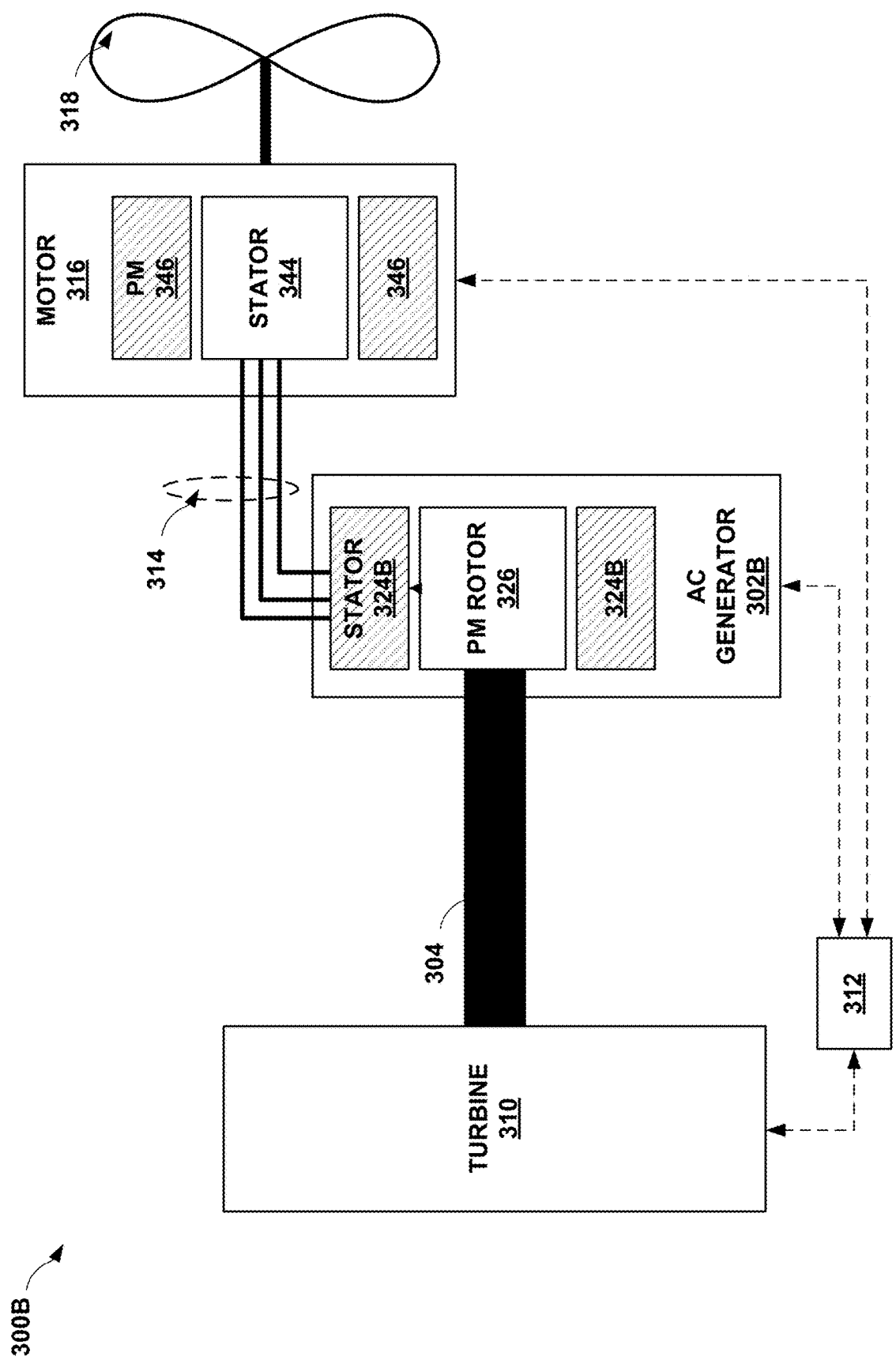

FIGS. 3A and 3B are conceptual diagrams illustrating, respectively, system 300A and system 300B as additional examples of a portion of system 1 of FIG. 1. FIGS. 3A and 3B are described below in the context of FIG. 1. Only one motor 316 is shown in each of FIGS. 3A and 3B; the quantity of motors 316 in systems 300A and 300B depends on an aircraft sizing and configuration.

FIG. 3A and FIG. 3B show, respectively, systems 300A and 300B as example portions of an example AC-type TeDP system in accordance with the described circuits and techniques. System 300A includes turbine 310 mechanically coupled to exciter 312 and AC generator 302A. System 300A further includes propulsor 306, including motor 316 and fan 318, which is electrically coupled to AC generator 302A via bus 314. System 300B includes turbine 310 mechanically coupled to AC generator 302B and propulsor 306, including motor 316 and fan 318, which is electrically coupled to AC generator 302B via bus 314. In each of systems 300A and 300B, motor 316 is mechanically coupled to fan 318.

Turbine 310 produces mechanical energy that spins shaft 304 in each of systems 300A and 300B. Examples of turbine 310 include gas-powered turbines, wind-powered turbines, hydro-powered turbines, hydrogen powered turbines, nuclear-powered turbines, diesel-powered turbines, gasoline powered turbines, and any other type of turbine that provides sufficient mechanical energy to spin a shaft that drives an AC generator to produce electrical power.

Propulsor 306 represents any type of electrically driven propulsor that includes a motor and fan, such as motor 316 and fan 318. In system 300A, the speed ($\omega_F$) of propulsor fan 318 depends on a ratio of the pole count of AC generator 302A and the pole count of motor 316. Similarly, in system 300B, the speed ($\omega_F$) of propulsor fan 318 depends on a ratio of the pole count of AC generator 302B and the pole count of motor 316.

Control unit 312 of systems 300A and 300B may send and receive information for controlling the speed at which shaft 304 spins, the current or voltage level at bus 314, and/or the speed at which fan 318 spins. In some examples, control unit 312 can control the quantity of pole pairs with which motor 316 of propulsor 306 uses to convert electrical energy at bus 314 into mechanical energy for spinning fan 318. In other words, control unit 312 may send a signal or command that configures motor 316 to operate with a particular quantity of pole pairs.

AC generator 302A is a directly coupled, wound field generator for providing a constant voltage, variable frequency, three-phase AC power. When rotor 322A spins, the electrical windings of rotor 322A become magnetized and produce a magnetic field that induces a current out of stator 324A. AC generator 302A draws electrical energy from exciter 312 to power rotor 322A. The more electrical energy (e.g., higher current) received from exciter 312, the greater the magnetic field produced by rotor 322A and the greater the voltage AC generator 302A produces at bus 314.

In operation, considering the example of FIG. 3A, control unit 312 may send signals to turbine 310 that cause turbine 310 to produce mechanical energy that spins shaft 304. The spinning of shaft spins rotor 322A of AC generator 302A. The spinning of rotor 322A of AC generator 302A may cause AC generator 302A to produce electrical energy (e.g., as a three-phase AC current) that leaves stator 324A at bus 314. Stator 344 of motor 316 may receive the electrical energy produced by AC generator 302A from bus 314. The electrical energy that motor 316 receives via bus 314 may cause stator 344 to produce a magnetic field that causes out runner permanent magnet (PM) machine 346 to spin. The spinning of PM machine 346 may produce mechanical energy that spins fan 318.

As indicated above, exciter 312 produces electrical energy based on the rotation of shaft 304 to magnetize the windings of rotor 322A. The output of exciter 312 then controls the magnetic field of rotor 322A to produce a constant voltage output by AC generator 302A. Control unit 312 may control the output from exciter 312 by varying the field current of exciter 312. For example, control unit 312 may include a voltage regulation circuit or perform voltage regulation techniques to manage the output of exciter 312 which, in turn, manages the voltage produced by AC generator 302A. The distribution voltage at bus 314 is managed by the voltage regulation circuit of control unit 312 and/or voltage regulation techniques performed by control unit 312 and the AC frequency of the electrical energy at bus 314 is a function of the speed of shaft 304.

In contrast to AC generator 302A, AC generator 302B is a directly coupled, permanent magnet generator configured to provide a variable voltage, variable frequency, three-phase AC power. When rotor 326 spins based on the spinning of shaft 304, the magnetic field produced by permanent magnets of rotor 326 rotates which induces a current at stator 324B. Stator 324B outputs the current as three-phase AC power that is then distributed via bus 314 to motor 316. Stator 344 of motor 316 may receive the electrical energy produced by AC generator 302B from bus 314 and the electrical energy that motor 316 receives via bus 314 may cause stator 344 to produce a magnetic field that causes PM machine 346 to spin. The spinning of PM machine 346 may produce mechanical energy that spins fan 318.

Similar to AC generator 302A, the AC frequency of the electrical energy provided by AC generator 302B at bus 314 is a function of the speed of shaft 304. However, since AC generator 302B can provide a variable voltage, system 300B and/or control unit 312, may need to perform close monitoring and matching of the speed of AC generator 302B and the speed of motor 316. For example, control unit 312 may receive information from AC generator 302B that is indicative of the speed of PM rotor 326 and use that information to control the required voltage at bus 314 and in turn, the required speed of PM machine 346.

In any case, whether a permanent magnet generator such as AC generator 302B or a field wound generator such as AC generator 302A, is used to power motor 316, the speed of fan 318 can be varied in at least one of two ways. In some examples, control unit 312 may perform operations similar to an engine controller and control the speed of shaft 304. In other examples, control unit 312 may vary the pole ratio between motor 316 and AC generators 302A and 302B. Varying the pole ratio, may require control unit 312 to reconfigure the stator and rotor windings (where available) of AC generators 302A and 302B, and/or propulsor 306 and motor 316, thereby changing the number of pole pairs. For example, as is described in U.S. Publication 2012/0286516 A1 by Ellis Chong, some generators are variable speed generators with selectable field windings that provide the ability to select various pole configurations which may be used to change the number of pole pairs.

The techniques and circuits described herein assume that the example AC-type TeDP system, such as system 1, 300A and/or 300B, is a variable speed electrical distribution system driving the propulsor motors. However, in other examples, at least some of the techniques and circuits described herein may be applicable to different types of propulsion system (e.g., mechanical distribution concepts) in which the gear ratios between generator and motor are fixed.

In some examples, the pole count associated with propulsor motors 316 and generators 302A and 302B may be changed while in operation (e.g., by switching windings). For example, control unit 312 may send a signal or command that causes motor 316 and other propulsor motors with which motor 316 is associated with, to switch windings and therefore, vary the pole pair ratio between them. By switching windings on the fly in this way, control unit 312 may enable an aircraft to vary its audible sound signature on-the-fly, by changing the gear ratio between motors and generators, and the ratio of pole pairs between motors, during operation.

Figure 4:
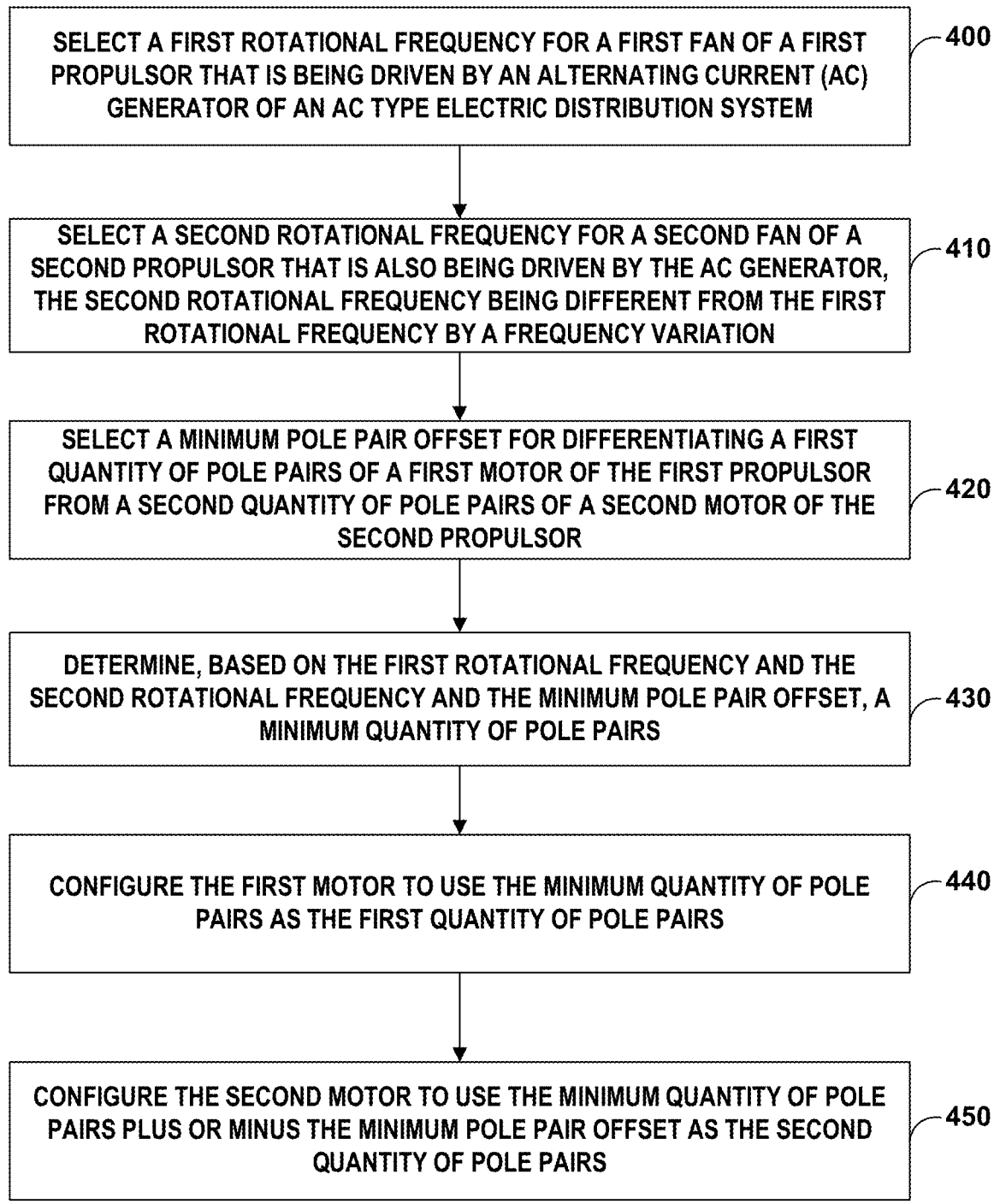
FIG. 4 is a flow chart illustrating example operations performed by a controller of the example electric propulsion system of FIG. 1, in accordance with one or more aspects of the present disclosure.

FIG. 4 is a flow chart illustrating example operations 400-450 performed by control unit 12 of system 1 of FIG. 1, in accordance with one or more aspects of the present disclosure. FIG. 4 is described below in the context of system 1 of FIG. 1. The operations of FIG. 4 are set in the context of control unit 12 being able to configure the respective pole counts of AC generator 2 and motors 16 such that fans 18 rotate with respective rotational frequencies and speeds, that spread the noise being generated by fans 18 as fans 18 rotate across a wider noise spectrum, or even in some examples, to cancel out some of the noise of fans 18, or at least prevent the noise from fans 18 from being additive.

In operation, control unit 12 of system 1 may select a first rotational frequency for a first fan of a first propulsor that is being driven by an alternating current (AC) generator of an AC type electric distribution system (400). For example, control unit 12 may select fan 18A to have a base rotational frequency $f_{F18A}$ of one hundred hertz.

Control unit 12 of system 1 may select a second rotational frequency for a second fan of a second propulsor that is also being driven by the AC generator, the second rotational frequency being different from the first rotational frequency by a frequency variation (410). For example, control unit 12 may want to provide sufficient coverage across a wide noise spectrum, control unit 12 may separate the rotational frequencies of fans 18 by a frequency variation or frequency offset of approximately ten hertz. Therefore, control unit 12 may select fan 18B, the fan that is next to and on either side of fan 18A, to have a rotational frequency $f_{F18B}$ of one hundred ten hertz.

Control unit 12 may select a minimum pole pair offset for differentiating a first quantity of pole pairs of a first motor of the first propulsor from a second quantity of pole pairs of a second motor of the second propulsor (420). For example, to ensure that control unit 12 provides small frequency changes (e.g., ten hertz) between fans 18, control unit 12 may select a minimum pole pair offset of two pole pairs. In other examples, control unit 12 may select a larger pole pair offset (e.g., more than two pole pairs) or a smaller pole pair offset (e.g., one pole pair).

Control unit 12 may determine, based on the first rotational frequency and the second rotational frequency and the minimum pole pair offset, a minimum quantity of pole pairs (430). For example, using EQ. 3, control unit 12 may compute the minimum quantity of pole pairs needed by motor 16A in order for motor 16A and motor 16B to operate fans 18A and 18B at one hundred hertz and one hundred ten hertz, respectively. Based on EQ. 3, control unit 12 may determine that motor 16A must use a minimum of twenty pole pairs when driving fan 18A.

Control unit 12 may configure the first motor to use the minimum quantity of pole pairs as the first quantity of pole pairs (440). For example, control unit 12 may send a signal or control command to motor 16A that enables the particular windings of motor 16A that are needed for motor 16A to operate using twenty pole pairs.

Control unit 12 may configure the second motor to use the minimum quantity of pole pairs plus or minus the minimum pole pair offset as the second quantity of pole pairs (450). For example, control unit 12 may send an additional signal or control command to motor 16B that enables the particular windings of motor 16B that are needed for motor 16B to operate using twenty two or eighteen pole pairs.

With motors 16A and 16B configured accordingly, control unit 12 may configure the other motors 16 as well to operated at different speeds. For example, control unit 12 may configure a third motor of a third propulsor that drives a third fan to use the first quantity of pole pairs. For instance, not all motors 16 need operate at different rotational frequencies. Control unit 12 may send one or more signals or control commands to motor 16C to configure motor 16C to also operate using twenty pole pairs, and as such, cause fan 18C to rotate with a rotational frequency of one hundred hertz. In some examples, control unit 12 may configure two motors 16 to operate their respective fans 18 with the same quantity of pole pairs, but in opposite directions. Said differently, when a first and third motor are configured to operate using the same quantity of poles, control unit 12 may configure the first motor to spin the first fan in a first direction and configure the third motor to spin the third fan in a second direction that is opposite the first direction. For example, after configured motor 16C to operate using twenty poles similar to motor 16A, control unit 12 may send additional control signals to motors 16A and 16C to cause fans 18A and 18C to spin in opposite directions.

In some examples, control unit 12 may determine the first rotational frequency for the first fan based on a rotor speed of the AC generator and a ratio between a quantity of generator pole pairs of the AC generator and the first quantity of pole pairs. For example, using EQ. 2, control unit 12 may receive information from AC generator 2 that is indicative of the speed ($\omega_G$) at which AC generator 2 spins. To compute the speed ($\omega_F$) of fan 18A, control unit 12 may determine the quantity of pole pairs ($p_G$) of AC generator 2 and the quantity of pole pairs of motor 16A ($p_M$), to determine the speed ($\omega_F$) at which fan 18A will be spinning. With the speed ($\omega_F$) of fan 18A computed, control unit 12 can further compute the rotational frequency ($f_F$) of fan 18A (e.g., based on the principles of EQ. 1).

In one or more examples, the operations described may be implemented in hardware, software, firmware, or any combination thereof. If implemented in software, the operations may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. An alternating current (AC) type electric propulsion system, comprising:
   a first AC generator having a first quantity of generator pole pairs and a first rotor that spins at a first generator speed;
   a first plurality of propulsors electrically coupled to the first AC generator, wherein each propulsor of the first plurality of propulsors comprises a first motor that drives a first fan of the propulsor and has a first quantity of motor pole pairs;
   a second AC generator having a second quantity of generator pole pairs and a second rotor that spins at a second generator speed; and
   a second plurality of propulsors electrically coupled to the second AC generator, wherein each propulsor of the second plurality of propulsors comprises a second motor that drives a second fan of the second propulsor and has a second quantity of motor pole pairs,
   wherein the first AC generator and the first motor are configured to drive the first fan at a first fan speed controlled by a first ratio of the first quantity of generator pole pairs to the first quantity of motor pole pairs,
   wherein the second AC generator and the second motor are configured to drive the second fan at a second fan speed, different than the first fan speed, controlled by a second ratio of the second quantity of generator pole pairs to the second quantity of motor pole pairs.

2. The AC type electric propulsion system of claim 1, wherein:
   the first fan speed is based on the first generator speed and the first ratio between the first quantity of generator pole pairs and the first quantity of motor pole pairs; and
   the second fan speed is based on the second generator speed and the second ratio between the second quantity of generator pole pairs and the second quantity of motor pole pairs.

3. The AC type electric propulsion system of claim 1, wherein the first fan speed is based on the second fan speed and at least one of:
   a third ratio between the first quantity of motor pole pairs and the second quantity of motor pole pairs, or
   a fourth ratio between the first quantity of generator pole pairs and the second quantity of generator pole pairs.

4. The AC type electric propulsion system of claim 1, wherein:
   the first motor drives the first fan of the first propulsor in a first direction; and
   the second motor drives the second fan of the second propulsor in a second direction that is opposite the first direction.

5. The AC type electric propulsion system of claim 1, wherein a third propulsor from the first plurality of propulsors comprises a third motor that drives a third fan of the third propulsor at the first fan speed.

6. The AC type electric propulsion system of claim 5, wherein:
   the first motor drives the first fan of the first propulsor in a first direction; and
   the third motor drives the third fan of the third propulsor in the first direction.

7. The AC type electric propulsion system of claim 5, wherein:
   the first motor drives the first fan of the first propulsor in a first direction; and
   the third motor drives the third fan of the third propulsor in a second direction that is opposite the first direction.

8. The AC type electric propulsion system of claim 1, wherein at least one of:
   the first AC generator or the second AC generator is configured with reconfigurable stator and rotor windings to change the respective first quantity or second quantity of generator pole pairs, or
   the first motor or the second motor is configured with reconfigurable stator and rotor windings to change the respective first quantity or second quantity of motor pole pairs.

9. A method comprising:
   selecting, by a controller, a first rotational frequency for a first fan of a first propulsor that is being driven by a first alternating current (AC) generator of an AC type electric distribution system;
   selecting, by the controller, a second rotational frequency for a second fan of a second propulsor that is also being driven by a second AC generator of the electric distribution system, wherein the second rotational frequency is different from the first rotational frequency by a frequency variation;
   selecting a minimum pole pair offset for differentiating:
      a first ratio between a first quantity of generator pole pairs of the first AC generator to control the first fan at the first rotational frequency, and
      a second ratio between a second quantity of generator pole pairs of the second AC generator and a second quantity of motor pole pairs of a second motor of the second propulsor to control the second fan at the second rotational frequency;
   determining, based on the first rotational frequency and the second rotational frequency and the minimum pole pair offset, a minimum quantity of pole pairs; and
   configuring
      the first motor to use the minimum quantity of pole pairs as the first quantity of pole pairs.

10. The method of claim 9, further comprising:
    configuring
       the second motor to use the minimum quantity of pole pairs plus or minus the minimum pole pair offset as the second quantity of motor pole pairs.

11. The method of claim 9, further comprising:
    configuring a third motor of a third propulsor that drives a third fan to use the first quantity of motor pole pairs.

12. The method of claim 11, wherein:
    configuring the first motor comprises configuring the first motor to spin the first fan in a first direction; and
    configuring the third motor comprises configuring the third motor to spin the third fan in a second direction that is opposite the first direction.

13. The method of claim 9, further comprising:
    determining the first rotational frequency for the first fan based on a rotor speed of the first AC generator and the first ratio between the first quantity of generator pole pairs and the first quantity of motor pole pairs.

14. An alternating current (AC) type electric propulsion system comprising:
    means for selecting a first rotational frequency for a first fan of a first propulsor that is being driven by a first AC generator of the AC type electric distribution system;
    means for selecting a second rotational frequency for a second fan of a second propulsor that is also being driven by a second AC generator of the AC type electric distribution system, the second rotational frequency being different from the first rotational frequency by a frequency variation;

means for selecting a minimum pole pair offset for differentiating:
  a first ratio between a first quantity of generator pole pairs of the first AC generator to control the first fan at the first rotational frequency, and
  a second ratio between a second quantity of generator pole pairs of the second AC generator and a second quantity of motor pole pairs of a second motor of the second propulsor to control the second fan at the second rotational frequency;
means for determining, based on the first rotational frequency and the second rotational frequency and the minimum pole pair offset, a minimum quantity of pole pairs; and
means for configuring
  the first motor to use the minimum quantity of pole pairs as the first quantity of pole pairs.

15. The AC type electric propulsion system of claim 14, further comprising:
  means for configuring
    the second motor to use the minimum quantity of pole pairs plus or minus the minimum pole pair offset as the second quantity of pole pairs.

16. The AC type electric propulsion system of claim 14, further comprising:
  means for configuring a third motor of a third propulsor that drives a third fan to use the first quantity of pole pairs.

17. The AC type electric propulsion system of claim 16, wherein:
  means for configuring the first motor comprises configuring the first motor to spin the first fan in a first direction; and
  means for configuring the third motor comprises configuring the third motor to spin the third fan in a second direction that is opposite the first direction.

18. The AC type electric propulsion system of claim 14, further comprising:
  means for determining the first rotational frequency for the first fan based on a rotor speed of the first AC generator and the first ratio between the first quantity of generator pole pairs and the first quantity of motor pole pairs.

* * * * *